United States Patent [19]

Schroeder et al.

[11] 4,428,056

[45] Jan. 24, 1984

[54] PLOTTING METHOD AND APPARATUS

[75] Inventors: Kenneth Schroeder, Wonder Lake; James Griffin, Carpentersville, both of Ill.

[73] Assignee: Pattern-Scan, Inc., Wonder Lake, Ill.

[21] Appl. No.: 266,071

[22] Filed: Jun. 1, 1981

[51] Int. Cl.³ .............................................. G06F 15/00
[52] U.S. Cl. .................................. 364/518; 364/560; 33/11
[58] Field of Search ............... 364/518, 520, 522, 521, 364/469, 470, 505, 560, 552; 33/1 F, 1 G, 11

[56] References Cited

U.S. PATENT DOCUMENTS

| 3,515,888 | 6/1920 | Lewis | 364/560 X |
| 3,596,068 | 7/1971 | Doyle | 364/470 |
| 3,777,126 | 12/1973 | Hoff | 364/505 |
| 4,058,849 | 11/1977 | Fitzgerald et al. | 364/520 |
| 4,313,073 | 1/1982 | Yamamoto et al. | 364/520 X |

OTHER PUBLICATIONS

Cursor Movement Control Circuitry, W. A. Bennett, Jr., et al., IBM Technical Disclosure Bulletin, vol. 21, No. 3, Aug. 1978, pp. 1184–1186.

Primary Examiner—Edward J. Wise
Attorney, Agent, or Firm—Leydig, Voit, Osann, Mayer & Holt, Ltd.

[57] ABSTRACT

Method and apparatus for producing a detailed plan to a known scale showing an optimized fit of material of predetermined dimensional characteristics into a given area. The invention finds utility in the field of carpet installation. After the perimeter of the area to be carpeted is measured, an array of signals is produced and stored to identify the coordinates of the area. A detailed plan, which is produced by interaction between an operator and the plotting system, shows the area outline, all seam locations, and the length of each strip needed to cover the given area.

4 Claims, 8 Drawing Figures

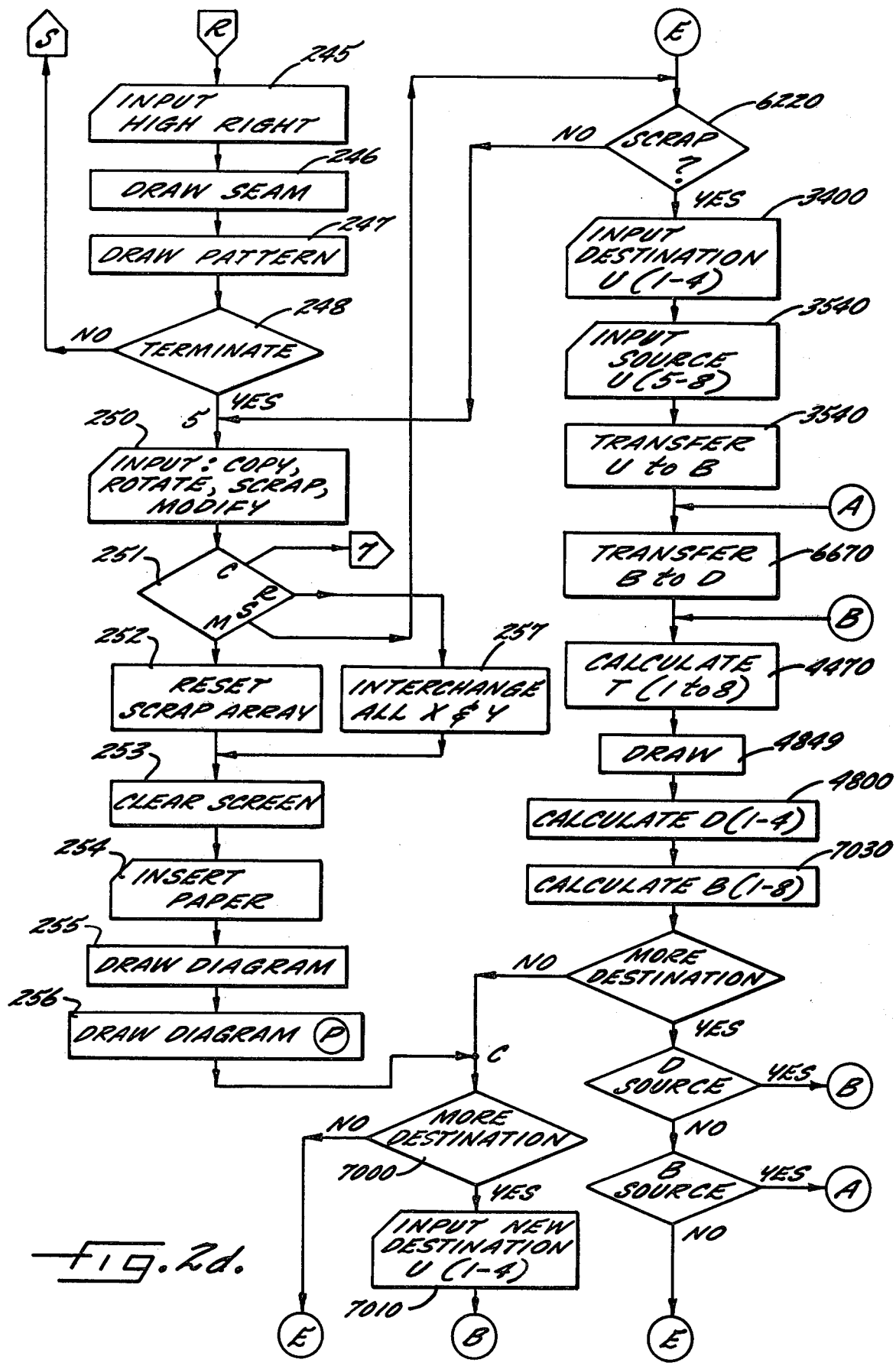

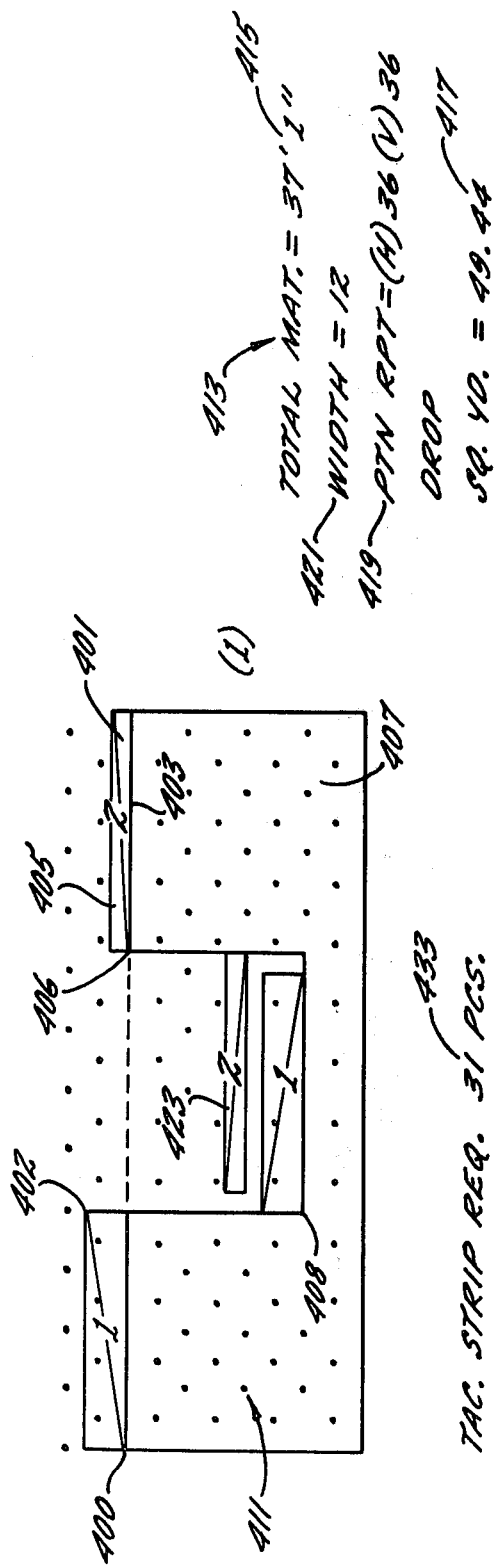

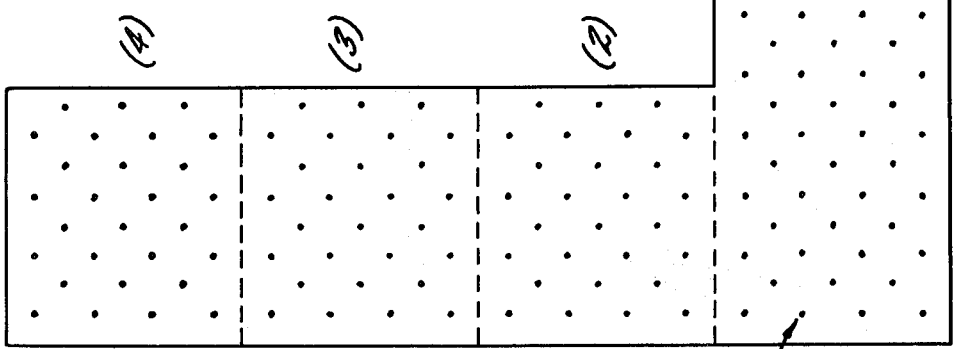

PLOTTING METHOD AND APPARATUS

This invention relates to fitting of material into areas of predetermined shape. While having broader applicability, the invention will be described in connection with fitting of roll goods such as carpet or linoleum into floor areas.

In estimating the amount of carpet needed to cover a given area, it is first necessary to measure the area. This is usually done by stretching a tape along each wall of the area to be carpeted and generating a rough diagram with each length along the perimeter dimensioned.

Having accomplished that, it is then necessary to "fit" the roll goods to the area, keeping in mind the factors of optimizing seam position (or at least avoiding improper seam locations) minimizing waste, and matching the pattern, if any. In the past this has been done "by hand" by an experienced estimator who works with pencil, scratch pad, and his experience, to attempt to determine how many yards of roll goods are necessary to complete the job and also how those roll goods should be cut and fit to install the job. If the estimator and the installer are different people, it is also necessary to provide some means of communicating the estimator's "game plan" to the installer.

As is appreciated by those skilled in this art, this practice is prone to introduction of errors, particularly in the case of inexperience estimators. If the error is on the high side, the result is the purchase of excess materials and the ill feeling on the part of the consumer that can create. If the error is on the short side, the result is often a job which cannot be installed in the first instance, or if installed improperly must later be removed and replaced at great expense to the carpet seller.

The need exists, especially in the case of high volume carpet or floor covering retailers, to eliminate to the greatest extent possible opportunities for introducing errors into this estimating practice. Assuming the relatively mechanical job of perimeter measuring can be accomplished, it would be highly desirable to assure that those measurements can be transformed, knowing the characteristics of the roll goods, into an accurate and efficient estimate of the needed material as well as a plan from which the installer can accurately cut and install the material in the required area.

In view of the foregoing, it is the general aim of the present invention to provide means for accurately transforming perimeter area measurements into a detailed plan from which roll goods can be cut and installed. More particularly, it is an object of the present invention to provide means into which perimeter measurements can be entered, much as they are initially taken, along with information which characterizes the roll goods, such means being adapted to produce a foolproof and detailed layout from which the material can be cut and installed. A further object, in that regard, is to determine the dimensions of the goods needed to fit a particular layout.

It is an important but subsidiary object to provide such means which minimizes the amount of material required.

According to one aspect of the invention, it is an object to provide means which match scrap and destination areas to accurately and efficiently make use of carpeting which would otherwise be scrapped.

An additional object according to the present invention is to provide such means which takes into account the dimensional characteristics of any pattern in matching the material pattern from piece to piece.

According to another aspect of the invention, an object is to provide such a system which is interactive in that it accepts information from the user, then provides the user information which serves an aid in inputting further information to optimize the layout.

Other objects and advantages will become apparent from the following detailed description when taken in conjunction with the drawings in which:

FIGS. 2a–2e are flow charts illustrating a sequence of steps useful in practicing the present invention;

FIG. 3 is a typical layout plotted in accordance with the present invention;

FIG. 4 is another typical layout plotted in accordance with the present invention.

While the invention will be described in connection with a preferred embodiment, there is no intent to limit it to that embodiment. On the contrary, the intent is to cover all alternatives, modifications, and equivalents included within the spirit and scope of the invention as defined by the appended claims.

Figure 1:
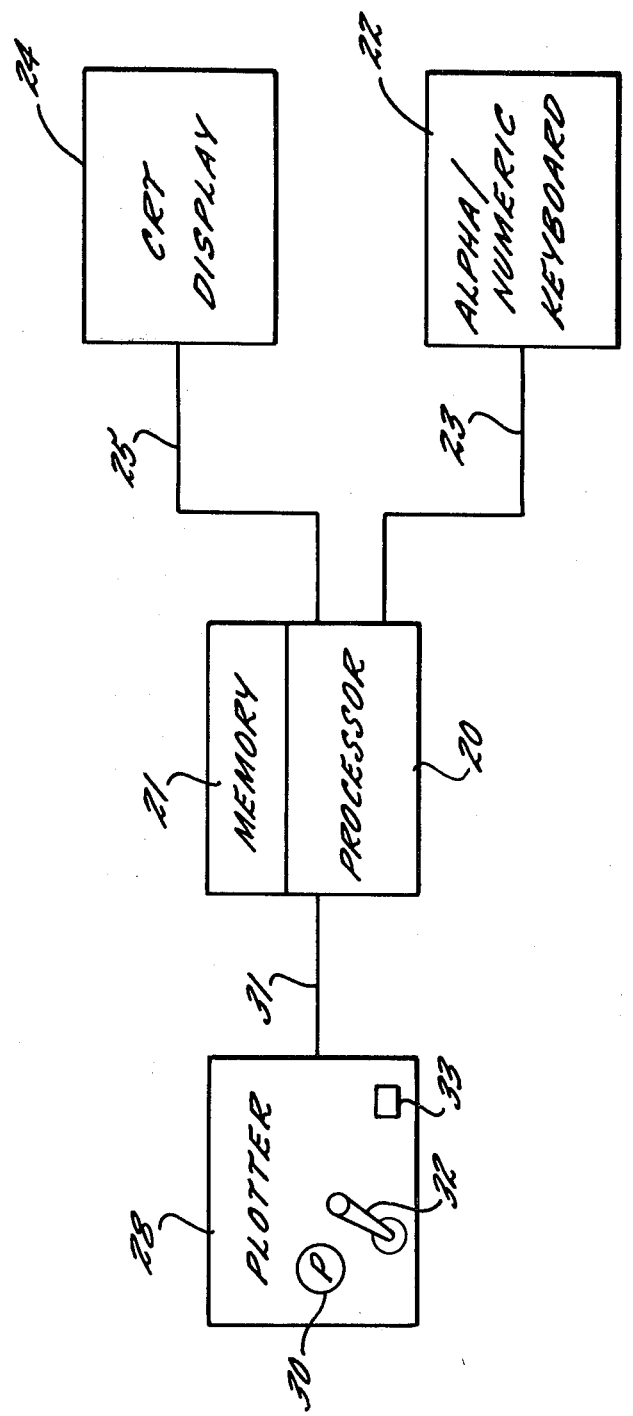
FIG. 1 is a block diagram showing the interrelationship between the elements of an exemplary embodiment of the present invention.

Turning now to the drawings, FIG. 1 shows, in block diagram form, a combination of elements useful in practicing the present invention and the relationship therebetween. More particularly, a central processor 20 has an associated program memory 21 conditioned by a sequence of steps (to be described below) to control certain aspects of the interactive method for fitting of material of predetermined dimensional characteristics into a given area. The central processor has circuit connections to an alpha/numeric keyboard 22 which provide one means for operator entry of information. Keystrokes on the keyboard 22 serve to transfer signals along a path schematically illustrated at 23 to cause the processor to perform desired functions. For providing temporary display of information under processor control, the system also includes a CRT display 24, having a schematically illustrated signal path 25 to the central processor.

In practicing the invention, a plotter 28 is provided which not only responds to signals from the processor 20 for making an appropriate diagram, but which also allows operator entry of data via the plotter to the central processor as a means of interactively generating the necessary layout. To that end, the plotter 28 has a pen 30 which can be driven by the central processor 20 by means of signals conveyed along the path schematically illustrated at 31, to move the pen and mark an associated paper with any desired pattern. In addition, the plotter 28 has a manual control 32, preferably in the form of a joystick which allows an operator to advance the pen 30 to any point on the platen of the plotter. For the purpose of conveying a signal from the plotter to the processor, a call button 33 is provided, which can be depressed by the operator after properly positioning the pen 30, and which results in the conveying of signals from the plotter to the processor identifying the pen location.

The separate signal paths 23, 25, 31 are intended to illustrate in schematic form the various paths for information exchange. In particular embodiments of the invention, such paths can be implemented by separate multi-conductor interface cables, or by arranging all of the units 21, 22, 24 and 28 to share a common data and address bus. The presently preferred embodiment of the invention implements the elements of FIG. 1 by way of the commercially available Tektronix 4051 Graphic System with 32k of memory (or the 4052 Graphic System with 64k of memory), used in conjunction with the 4622 Graphic Plotter.

Exhibit 1 which is attached at the end of this specification and made a part hereof is a source listing showing a preferred sequence of program steps capable of causing the aforementioned Tektronix Graphic System equipment to perform in accordance with the present invention. The reader is referred to the listing for the technical detail useful in practice of this invention. The following description will supplement such disclosure by first relating the manner in which an operator utilizes the graphic system to practice the invention, and secondly, by characterizing and generally describing modules of the program with reference to the flow charts of FIGS. 2a-2e.

Before proceeding to that description, however, it will be worthwhile to generally review the underlying philosophy by which an operator and the system interact in the practice of the present invention.

First of all, in order to fit roll goods into a given area, one must first know the shape and dimensions of the given area. While it is not overly difficult to estimate the amount of carpet required to cover a regular 9×12 room, if it is also desired to carpet the associated closet, the adjacent hallway, and perhaps another room, the problem becomes more complex. If the carpet has a pattern which must be matched throughout the installation, a further degree of difficulty is introduced. Whatever the situation, however, it is not unusual to start with a hand drawn sketch of the area to be covered, with a dimension associated with each line defining the perimeter.

In order to simplify communication of the area boundaries from the operator to the plotter device, the system is arranged to begin at a selected point, then accept signals relating to the dimensions of each boundary line, proceeding in sequence from the starting point around the periphery and typically returning to the starting point. The system is arranged to accept those signals in familiar units, such as feet and inches, to apply a desired scale factor (relating to the scale of the plot to be produced) and to create an array of signals stored to define the coordinates of the given area. In addition to accepting that input, the plotter is also operated to draw the outline being generated, which allows the operator to check the shape of the plot being produced against his original sketch. The plotted area not only shows the operator that he has correctly reproduced the sketch, but also serves to allow the operator to identify, on the drawings being produced, particular coordinates for specific purposes. For example, after the area is drawn, the operator is allowed to manually position the plotter pen, then to transmit a signal to the controller which serves to identify a selected seam line. Since the system had previously been provided a set of signals defining the dimensional characteristics of the roll goods, the plotter then operates to draw all seam lines within operator defined boundaries.

As a second example of operator interaction with the drawing being produced, the operator is afforded the ability to identify source locations, which would otherwise be removed for scrap, and to further identify selected destination locations where it is desired to utilize such scrap. The system is configured to select from the identified source, dimensional segments which are capable of fitting the destination, will full attention to pattern match. The plotter is then driven by the system to draw not only the destination areas to be covered from the source, but also the exact portions of the source area which are to be cut to fit those destinations.

As a final example of operator interaction with the plot being generated, the operator is afforded the ability to manipulate the plotter pen and produce signals for the system which identify the dimensions of particular carpet lengths. The system is configured to utilize that input in calculating the exact length for each strip, and for determining the order in which the strips are to be cut from the roll in ordr to minimize the amount of inter-strip waste.

With that general philosophy in mind, attention will now be directed to a typical sequence of operation from the point of view of the operator and the actions he witnesses the system taking during the course of producing a plot.

In order to assist the operator to the maximum extent possible, the system is configured to display prompting messages on the CRT, indicating the type of information desired at each point in the cycle. The message first displayed to the operator at the start of the cycle is "Enter Scale Factor". This provides the operator the ability to select the scale to which the plotter will draw the diagram. In the exemplary system the scale factor indicates the number of inches of the diagram which will represent one foot of the actual room's length or width. For an average residential layout, a scale factor of 0.150 inches per foot is often useful, whereas for larger commercial layouts, smaller scale factors might be required.

Having accepted the scale factor information, the system displays the following message: "Input Horizontal Dimension". In the exemplary embodiment, when this prompting request is first given, the plotter pen is in the lower lefthand corner of the diagram, and the information being requested is the length of the horizontal line which will form the base of the layout. The system is configured to accept the information in feet and inches separated by a comma. Momentary depression of the Return key after entry of the horizontal dimension causes the processor to accept related signals from the keyboard and store such signals in an array identifying the coordinates of the end points of the line just dimensioned.

Having entered the first horizontal dimension, the CRT is caused to display the following prompt "0=No Draw, 1=Draw, 2=Draw/Terminate". The operator selects one of the functions by typing the respective number thereof, followed by a momentary depression of the Return key. The No Draw instruction causes the plotter to reposition the pen at the end of the line whose dimension had been input without marking the paper. The Draw command causes a similar function, only with the pen in contact with the paper to make a horizontal line thereon scaled to the dimension just input. The Draw/Terminate command is used after the last dimensional entry, causing the program to advance to the next stage.

Assuming that either the No Draw or Draw commands have been given, the system, in addition to storing the signals described above and moving the pen, responds with the following prompt: "Input Vertical Dimension". Just as in the case of the horizontal entry, the dimension associated with the next line defining the periphery of the given area is entered in feet and inches. Following entry of the number, the system prompts with the "0=No Draw, 1=Draw, 2=Draw/Terminate" prompt.

The system continues to cycle between horizontal and vertical entries until the Draw/Terminate command is received. Any entry which would cause movement of the pen to the right or upwards on the diagram is considered a positive number and can be entered without sign. Any entry which would cause movement of the plotter pen to the left or downward on the diagram is considered a negative entry and must be preceded by a minus sign. As the plotter pen sequentially plots each boundary segment under the direction of the operator, he has the opportunity to roughly check the shape of the plot being generated against his original sketch. Entry of dimensional data related to the given area is then ended by answering the "0=No Draw, 1=Draw, 2=Draw/Terminate" prompt with a terminate command.

The system then sequences to the portion of the cycle which allows the operator to enter the dimensional characteristics of the material to be fit within the given area. The first prompt in this area of the sequence is "Horizontal Pattern Repeat (inches)." The information desired at this time is the horizontal repeat dimension of the material in inches. If the material to be fit in the given area has no pattern, a 0 is entered. If a number other than 0 were entered for the "Horizontal Pattern Repeat (inches)", the system responds by storing appropriate signals and displaying the following prompt: "Vertical Pattern Repeat (inches)". In response, the operator should input the vertical repeat dimension of the material in inches.

Following entry of the repeat dimensions, the system requests the following information: "Print Pattern Repeat (1=Yes, 0=No)." If Repeat dimensions were given, all of the system manipulations regarding fitting of the material into the given space will take account of the pattern. This prompt, however, simply asks whether the plot which is to be generated should have some indicia relating to the repeat pattern for further guidance of the installer. A yes command will result in the printout of a dot pattern identifying points in the repeat pattern. A no response to this prompt will cause the system to be plotted without dots identifying the repeat pattern, but will still take account of the repeat pattern in fitting and estimating the material.

A further dimensional characteristic required of patterned materials is the information as to whether a drop pattern is involved. If adjacent patterns along the width of the material are aligned, the response to the prompt "Drop Pattern (1=Yes, 0=No)" is No. If, however, a drop pattern is involved, the response is Yes. The system responds by entering the associated information, then follows with the following prompt "Tackless (1=Yes, 0=No)." If the operator desires the system to determine the number of four foot tackless strips which will be required to install the job, he depresses the 1 key for an affirmative response. The final piece of information relating to dimensional characteristics of the material is provided in response to the prompt "Roll Width". The operator types in the roll width in feet which, when accepted by the processor, sequences to the next operation in which the operator is asked to manually manipulate the plotter to establish the first seam position. The prompt displayed to the operator is "Set Seam Position-Push Call."

In responding to this prompt, the operator makes use of the partly produced plot in selecting on the scaled layout a desired seam position. For example, if the base line or some other horizontal line on the plot is defined by a wall in the actual area, the operator might select that wall as the key seam line. Some other physical feature in the actual layout may cause the choice of some other position. At any rate, the operator uses the joystick on the plotter to advance the pen by any desired route to the point on the layout where he desires to set the first horizontal seam. When the pen is positioned in the proper location, the operator momentarily depresses the Call button on the plotter, which causes signals to be sent to the processor identifying the coordinates of the pen position. After the call button is momentarily depressed, the system then prompts "Input Low Left Boundary (Call)". The operator positions the pen in the region designating lower left corner of the area to be calculated, momentarily depresses the call button, which again causes signals to be sent to the processor identifying the coordinates of the pen position. Following this stage, the next prompt "Input High Right Boundary (Call)" appears, causing the operator to position pen to the uppermost right region of the specific area to be graphed with seams and pattern repeat points. This mode is repeated to allow for other seam locations not specified in the first boundaried area, and will advance to the succeeding mode when the call button is depressed three times without moving the plotter pen. The processor uses that information to establish a horizontal seam line at that location, and uses the previously entered roll width information to determine the location of all other seam lines within established boundaries.

Having received that information, the system then prompts as follows: "Enter C=Copy, M=Modify, R=Rotate, S=Scrap", which gives the operator four options. If on the one hand the operator determines from the information entered thus far that the layout is defective for some reason, he can enter an M command, which instructs the system that he desires to modify the layout, but without modifying the dimensions of the given area or the dimensional characteristics of the material. Typically this instruction is used when the operator is dissatisfied with seam positions and wishes to make a new selection. The program sequence, after reinitiating certain data arrays, reverts to the point at which the prompt "Set Seam Position-Push Call" is displayed. The sequence progresses as described above until the "Enter C=Copy, M=Modify, R=Rotate, S=Scrap" prompt is again displayed.

The Rotate command is useful when it is determined that it might be desirable to fit the roll goods not horizontally at the seams were previously drawn, but vertically. Since the system is configured to always "unroll" the goods horizontally, it is necessary to rotate the layout 90°. That is accomplished by the Rotate command.

The Scrap command is useful in irregular layouts where material which might otherwise be discarded can be used to fill certain small areas. Depression of the S key to enter the scrap routine causes the system to display the prompt "Define Destination and Source (Call)". The operator is then afforded the opportunity to utilize the partially completed plot in entering additional information regarding source and destination for scrap use. The operator first identifies a destination area using the joystick and call button on the plotter, by identifying coordinates at opposed corners. The joystick is moved to one corner, the call button depressed to enter the coordinate, following which the opposite corner is identified.

Following the identification of the destination area, it is then necessary to identify the source area from which a piece corresponding in size and shape to the destination area will be taken. It is desirable to identify the largest source area possible, since the seam will only take the portion of the source necessary to fit the identified destination. As in the case of destination identification, the source is identified by manual manipulation of the plotter to identify opposed corners.

After the source is identified, the system will prompt the operator "New Destination (Y or N) (Call)". If there are further destination areas which can be filled from material available in the source, the operator enters Yes. If, on the other hand, the identified source area has been depleted, or if there are no new destination areas to be filled, the operator enters No, following which the system will determine the portion of the source needed to cover the destination, then plot both. Following that, the "Enter C=Copy, M=Modify, R=Rotate, S=Scrap" prompt is displayed, making any of the four options again available to the operator.

Ultimately the operator will be satisfied with the layout, and will indicate his acceptance by depressing the C key to enter the Copy command. The system will respond with the prompt "Select Dimensions Pickout Left (Call) Right (Call)". Again the operator is afforded the opportunity to utilize the partially completed plot to enter additional information, in this case signaling the length of each strip to the processor. That is accomplished by positioning the pen on the plotter using the joystick first at the left then at the right boundary of each strip, each position being signaled to the processor by momentary depression of the Call button. The pickoff exercise is terminated by a second and third depression of the call button after the last coordinate is entered and without moving the plotter pen.

The system has now been provided with all of the information necessary to complete the layout. It responds by completing the plot associating dimensions with each carpet length and by indicating the order in which the carpet lengths should be cut from the roll to minimize inter-length scrap.

Typical plotter drawings are illustrated in FIGS. 3 and 4 for two different floor plans. As there shown, each of the seam lines separating adjacent strips is identified. In FIG. 3, for example, seam 403 separates the large strip 407 from strip 401. The dashes collinear with seam 403 indicate the edge of the strips as cut from the original roll of material. FIG. 3 also shows the dot pattern generally designated 411 identifying pattern repeat points. The zigzag nature of the dots indicates that a drop pattern is involved. The tabulated information generally designated 413 at the right of the diagram illustrates both the total material length 415 and the total square yards 417 utilized. A price quote can be prepared directly from those figures. In addition, the pattern dimensional information including both the repeat dimension 419 and the roll width 421, is included. FIG. 3 also illustrates the use of scrap source and destination, with a source 423 identified on the plotter drawing by the drawn numeral 2. Its orientation is specified by a diagonal line beginning at upper left and running to lower right of the source rectangle 423. The associated destination is identified by destination rectangle 405 with the same drawn numeral 2, and a diagonal line joining the lower left and upper right corners. Thus the slant of the diagonal line discriminates between the source and destination. As best shown in FIG. 4, the drawn numeral adjacent each strip identifies the strip, whereas the length of each strip is indicated in a table generally designated 431 to the right of the strips, the sequence in the table indicating the order in which the strips are to be cut from the roll in order to minimize waste. The pattern of FIG. 3, in contrast, requires just one 37'1" strip cut from a 12' roll. Finally, the number of tackless strips 433 required to install the job is also drawn by the plotter.

Attention will now be directed to the flow charts comprising FIGS. 2a–2e which will be cross-referenced to the program listing in Appendix 1 along with a brief description of the operation being performed.

Figure 2A:
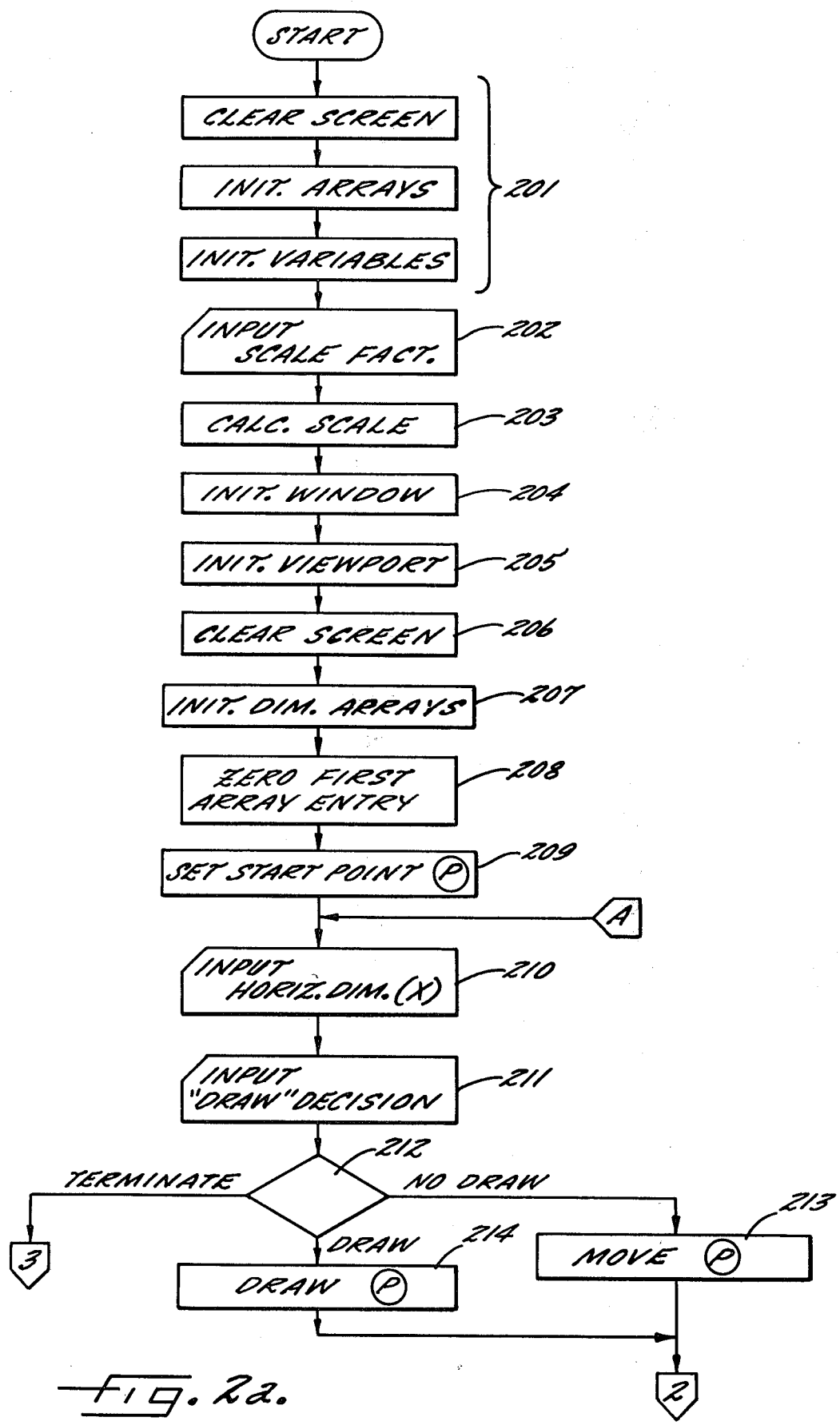

Turning to FIG. 2a, there are shown a group of steps bracketed at 201 which serve to initialize the system. The corresponding program steps are found in Appendix 1 at addresses beginning at 1 and ending at 101. It is seen that the screen of the CRT is cleared, areas of memory are set aside for storage of arrays of signals, and a group of variables is initialized. The input scale factor instruction 202 of FIG. 2a includes both the display of the prompt, which is accomplished by the step at address 102, as well as the actual input of the signal from the keyboard, which is accomplished at address 130. The succeeding steps at addresses 130 through 150 accomplish the step 203 of the flow chart, namely, calculation of a scale factor for use within the program corresponding to that entered by the operator.

Initialization of the window identified as step 204 in the flowchart (and address 160 in the program) serves to set limits for maximum display area of the CRT to be used. The Textronix graphics terminal automatically scales the data within the defined window area, to fully fill the graphic display. Similarly, the step 205 (accomplished at address 170) serves to set limits determin by the scale factor for travel of the pen on the plotter. The prompting message is cleared from the screen at step 206 (addresses 180 and 190).

The program sets aside a section of memory for storage of an array of signals relating to the coordinates of the dimensions of the given area which are to be input by the operator. Those arrays are initialized at 207 on the flowchart and by the corresponding code beginning at address 200 and encompassing the subroutine beginning at address 880. In effect, an area of memory is set aside which is three entries wide (X, Y and Z) and 200 entries long, and for purposes of convenience the number 201 is initially stored in each element of that array. The first coordinate entry is set to zero by the code beginning at address 230 and ending at address 250. This corresponds to the initial plotter pen position. The plotter starting point is set at step 209 of the flowchart, by the code located at address 260 through 300, which moves the pen to the position previously set into the array at the second coordinate array entry, corresponding to a point a fractional distance in relation to the height and width of the display area from the pen origin at the zero coordinates, in order to establish a margin on the drawing and on the display.

The program progresses to the step identified as 210 in the flowchart which encompasses the display of the prompting message for inputting the horizontal dimension (code address 330), and also the input of that number by the operator (address 340). The operator inputs the address in feet and inches as previously described.

The subroutine beginning at address 370 serves to convert that number to decimal feet for further operation. The number so converted is then converted to a coordinate by the code at address 490 which adds that number to the X coordinate in the previous location of the array, such tat reading down the X array one will encounter a succession of X coordinates for each sequential corner of the plotted area. Following the sequence indicated in the listing, the program advances through the step at address 2900 and returns to the address 550 where a Y signal is entered in this level of the array which is the same as the Y signal in the previous location. In the exemplary embodiment, only the entry of horizontal or vertical lines is allowed, such that only the X or Y coordinate will change in any given step. Since the step under consideration had been the entry of the horizontal dimension, it is seen that the horizontal or X coordinate had been altered according to the entered dimension, whereas the Y coordinate remains the same as the previous entry.

The program progresses to the address 560 where the draw decision prompt is displayed on the CRT. The operator performs the step 211 by entering either 0 for No Draw, 1 for Draw or 2 for Terminate. Terminate is only used at the end of the sequence after all of the data has been entered. Accordingly, in the present circumstances either 0 or 1 is input by the operator, which value is entered in that level of the array as the corresponding Z value (address 570). The No Draw action is accomplished on the plotter by the step at address 620, whereas the draw is accomplished by the instructions at addresses 590 and 600.

Figure 2B:
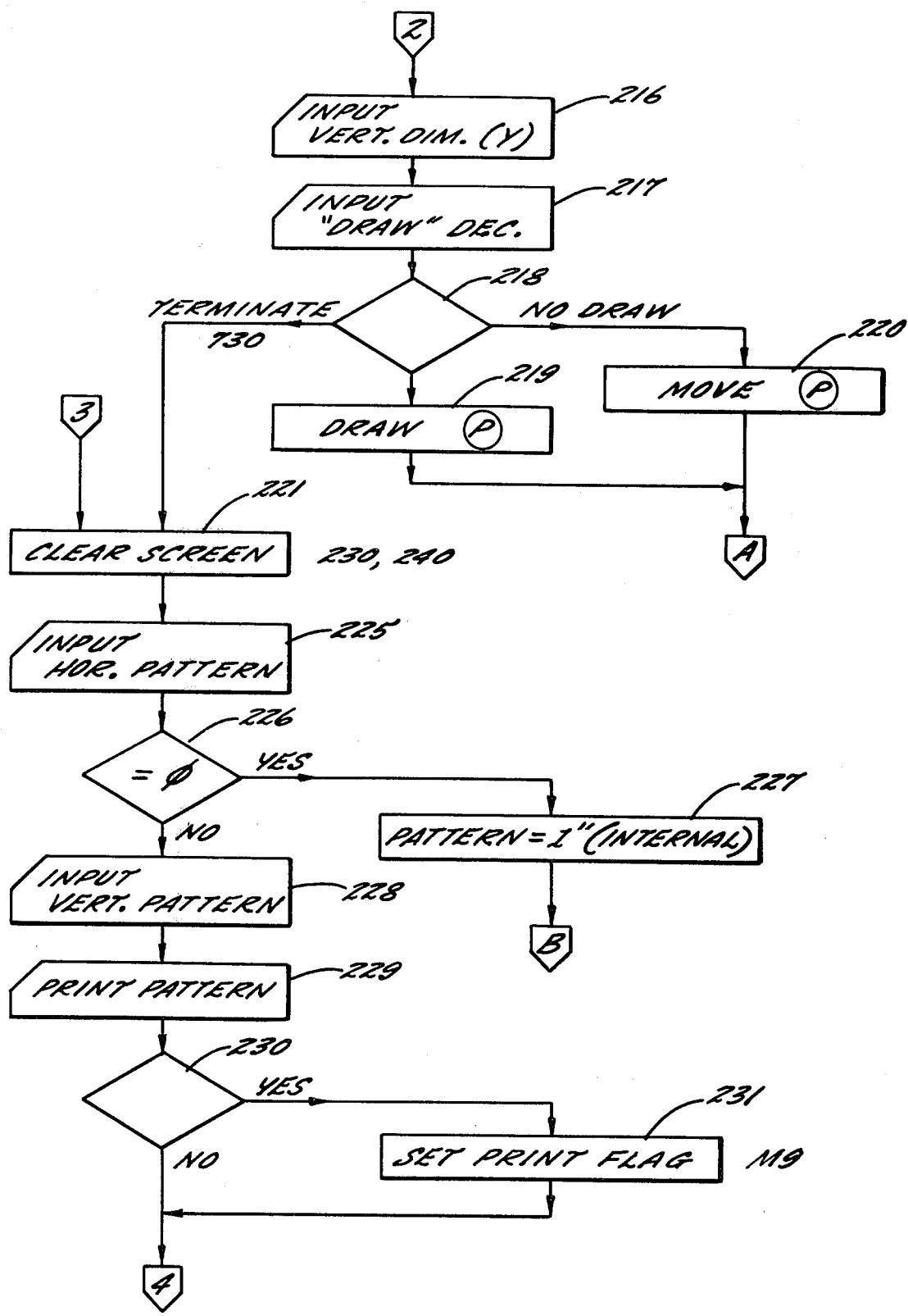
Figure 2C:
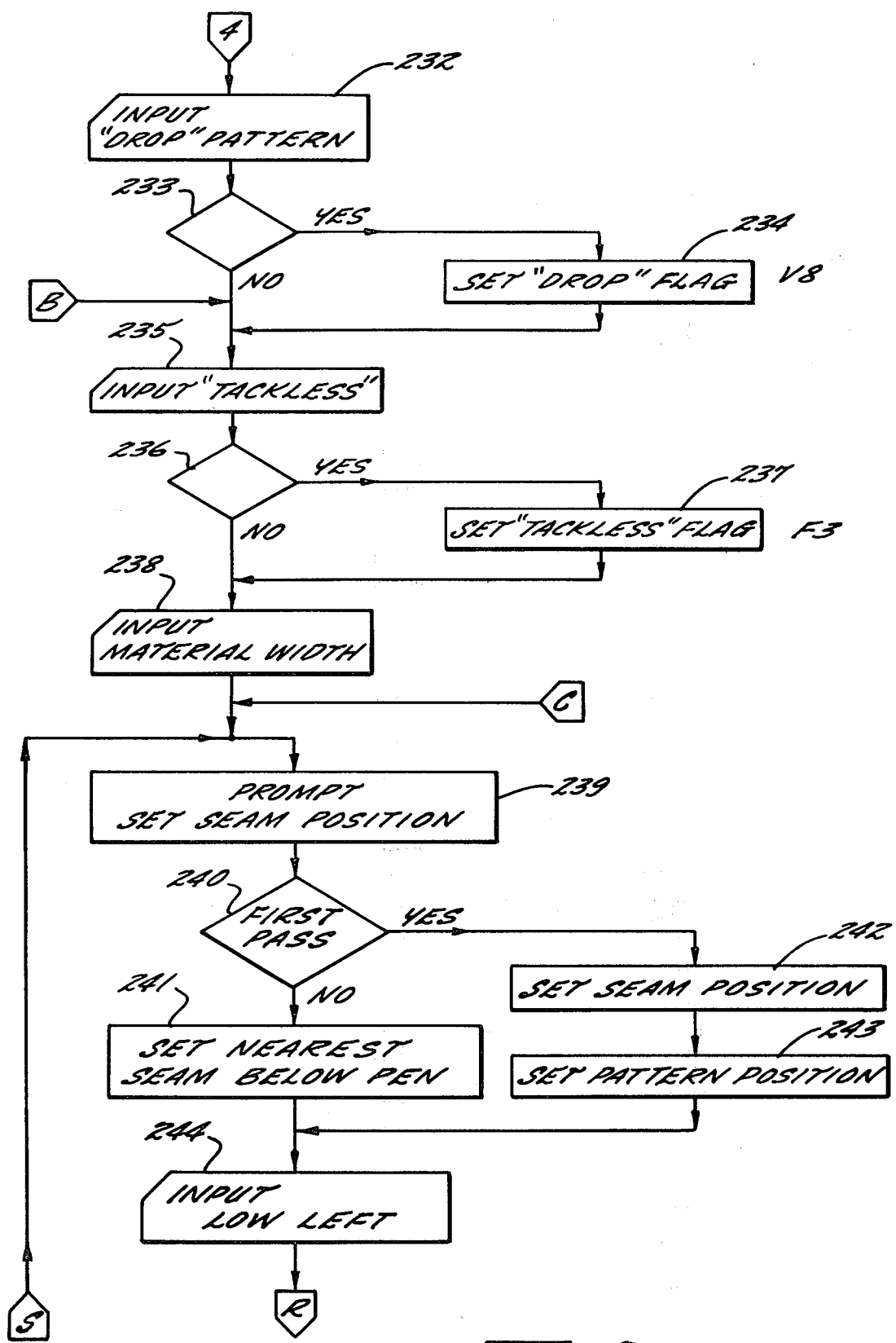
Figure 2E:
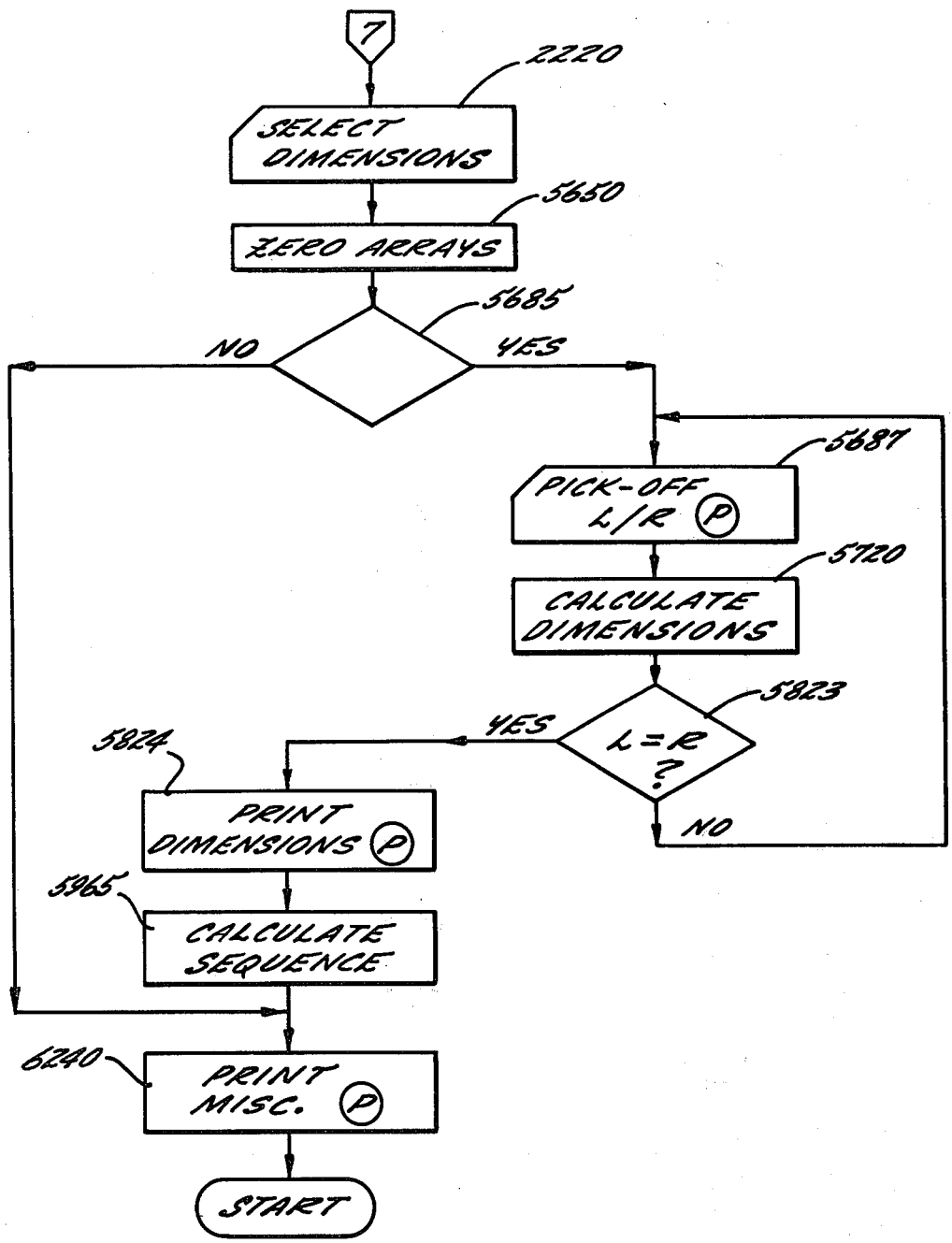

In either case, the program progresses to the inputting the vertical dimension indicated at 216 in FIG. 2b. The associated code begins at address 330, and operates much like the input of the horizontal dimension just described. The major difference is that the Y value of the associated step in the array is updated whereas the X value is carried through from the previous level. The program again sequences through the display of the Draw decision prompt and input 217, the branching instruction at 218, and either the draw operation 219 or the move operation 220, depending on operator selection. As indicated by the arrow A on FIG. 2b, the program then returns to the step 210 for input of a further horizontal dimension. Those routines continue to cycle until the operator is satisfied that all of the horizontal and vertical dimensions have been input. The operator then responds to the Draw decision input 211 or 217 by entering a terminate command which causes the execution of the step 221 clearing the CRT screen.

At this point, the system has been provided by the operator with all of the raw data which defines the given area to be covered. The array of signals which stores such data is an array of coordinates defining the location of each direction change from horizontal to vertical or vertical to horizontal. The sequence of that information in the array corresponds to the sequence around the perimeter beginning from the starting point, such that not only is the information in any step of the array important, but also the sequence of information through the array.

Following completion of those operations, the system then switches to the mode of operation which causes the input of information related to the dimensional characteristics of the material. A first operation 225 prompts the operator to input the horizontal pattern (code address 1110) and accepts that information and converts it to decimal feet by the steps stored at addresses 1120 through 1150. As shown in FIG. 2b, if a 0 is entered in response to the "Input Horizontal Pattern" prompt, the test at 226 causes a branch to an operation 227 which sets a flag internally and causes the program to advance beyond the remaining input sequence dealing with the dimensional characteristics of the pattern.

Assuming that a dimension was entered for the horizontal pattern, the test 226 yields a negative result causing the program to advance to an operation 228 which prompts the operator to input the vertical pattern dimension. The steps for that prompt as well as the input and succeeding operations begin at address 1180 and follow in sequence. The operator is prompted at operation 229 to inform the system whether the pattern should be printed out on the plot to be made. If the operator provides an affirmative response, the test at 230 is positive, causing an operation at 231 to set a flag which will cause the pattern to be printed. The program sequences to an operation 232 which asks whether a drop pattern is involved, advancing the sequence to a test at 233. If the operator indicates that a drop pattern is involved, a drop flag is set at operation 234, following which the program advances to an operation 235. This is also the point to which the program branches, if the information provided by the operator at operation 225 indicated that no pattern was involved.

In responding to the prompt at step 235, the operator determines whether or not he wants the system to calculate the number of tackless strips required to install the job. If he does, information is input which causes the test at 236 to yield a positive result, setting a flag at operation 237 which will cause the perimeter of the given area to be measured. It is noted that the perimeter dimension is calculated at address 590 during input of the area dimensions. The program advances to an operation 238 which prompts the operator to input the roll width and which accepts that information when typed in.

In summary, the system has now been provided with all of the perimeter information of the given area to be carpeted, and all of the dimensional information relating to the material to fit the given area. In addition, the partial plot produced to this point shows the outline of the area to be covered in the scale selected by the operator.

In practicing the invention, the operator now uses the partially produced plot to input further information to the system for the purpose of generating a final plan. At the step 239, the system displays the prompt "Set Seam Position-Push Call" by means of executing the operation at address 22005. In response, the operator manipulates the joystick to position the plotter pen on the diagram at the location he has selected for a key seam. Upon depression of the call pushbutton, the operation at address 22010 serves to input the coordinates of the pen which had been positioned by the operator. The operations beginning at address 22010 and ending at address 22070, serves based on the dimensional characteristics of the goods, including the roll width and pattern dimensions if any, to determine the vertical location of each seam on the diagram. The first seam position, as detected by step 240, requires calculation of the initial seam and pattern positions via steps 242 and 243. Later seam and pattern positions are calculated from the initial positions, in step 241, using the strip width and pattern horizontal and vertical repeat increments. The horizontal locations of strip seams are manually entered via the call pushbutton in steps 244 and 245, corresponding to operation addresses 22090 and 22130. Since the horizontal and vertical seam and pattern coordinates are now defined, the seam and pattern can be drawn in steps 246 and 247, through operations at addresses 22140 to 32070 which generate horizontal dashed lines to indicate the seams and generate a periodic dot matrix to indicate the pattern.

The program then advances to the step 250 which prompts the operator to determine whether he desires to copy the program, rotate the diagram, go into the scrap routine, or modify the diagram which he had input to that point. The operator response is tested at 251 and the nature of the response indicates the manner in which the program will branch.

If, for example, the operator determines upon inspection of the partially produced plot that a seam is improperly located, he can type an M for "Modify" and revert to that portion of the program for selection of a new seam position. The program enters the modify loop at address 1720 and first performs an operation 252 which resets the scrap array. This is useful if the decision to modify the partial plot occurs after an attempt had been made to define source and destination for scrap. Following that, the operation 253 clears the screen, the operator is prompted to insert a new paper at 254 which, when accomplished, causes the system to display the outline of the area on the CRT by means of step 255 and redraws the diagram on the plotter at step 256. The screen is cleared by the instructions at addresses 1721 and 1722, the prompt is displayed by the instruction at address 1723. The branch for the subroutine which causes replotting of the outline is located at address 1735.

The corresponding point on the flowchart is shown by the designator C leaving the operation 256, and returning to the operation 239.

If on inspection of the partly produced diagram it is determined that it would be preferably to run the carpet length vertically on the diagram as opposed to horizontally, the operator responds to the prompt at step 250 by typing R to select the Rotate subroutine. The test 251 causes a branch to an operation 257 (beginning at address 2930) which, as indicated in the code, after performing some reinitiation, serves to interchange the X and Y coordinates at each level in the array. Thus, vertical coordinates become horizontal and horizontal coordinates become vertical which serves to rotate the diagram 90°. The rotated diagram is then replotted using the operations 253–256 just as in the case of the Modify operation.

The partly produced diagram which exists when the step 250 is first arrived at is useful in identifying areas of carpet which might otherwise be scrapped, which can instead be used to cover small areas not reached by a full roll. More particularly, the room outline is displayed to scale, and the drawing of the seams (and pattern if desired) serves to show how the carpet material would overlie the room area. Any area of roll goods which is not coincident with the room outline is available for use elsewhere and can thus be identified as a scrap source for utilization at defined destination locations. Referring, for example, to FIG. 3, it is seen that the room outline there shown is "U" shaped. The width of the roll goods is insufficient to cover the entire leg of the U, but a large scrap source is located within the U. The manner in which the source area is identified and fit into the destination at the legs of the U will now be described. The program first branches from the test 251 to a step 260 (which begins with the subroutine at address 3400). A message is displayed to the operator instructing him to define the scrap destination and source by means of manipulating the plotter. The operator responds by manipulating the joystick to position the pen at point 400 in FIG. 3, following which he depresses the call button. The operation at address 3420 causes signals to be passed from the plotter to the processor, to store the coordinates of the point 400. The operator then repositions the pen to the point 402 and a similar operation is performed. Those steps serve to define a first destination area which will be covered with material taken from a specified source area now to be defined. Beginning at address 3540, the operator identifies to the processor the coordinates of the points 408, 406, the source area. The eight coordinates so entered are arranged in an array, termed the U array in a predetermined order.

Referring to the listing in the appendix, it is seen that the response to the prompt displayed at address 1660 is detected at address 1680 and causes the program to branch to address 6620. The program then immediately branches to address 3400 to perform the scrap input routine. The instruction at address 3400 causes an appropriae prompt to be displayed, following which two coordinates for the destination location and two coordinates for the source location are entered and stored in the U array. The program then returns to address 6640 which initially establishes a B array having coordinates equal to those in the U array, and a D array having four coordinates equal to the source coordinates in the U array. As will become more apparent, the coordinates in the D and B arrays are modified as the sequence progresses to indicate unused source or unfilled destination areas.

Upon reaching address 6700, the program branches to the subroutine at address 4470 which calculates a set of offsets relating the source and destination coordinates to reference points in the pattern. This is the area of the sequence which assures that the destination will be fit with an area taken from the source which matches the pattern at the destination. It is seen that the program branches to a subroutine beginning at address 4360 which calculates a vertical offset dimension at address 4380 and a horizontal offset dimension at address 4415. The sequence beginning at address 4510 takes account of a drop pattern if that is present.

The offset dimensions generated are used in the following manner. At address 4650 the calculated horizontal offset is added to the leftmost source coordinate to create a coordinate within the source defining the lefthand edge of the destination and which will match the pattern at the destination. The operation at address 4670 thereupon calculates the coordinate of the righthand edge of the source portion which will fit the destination. A similar operation for the vertical coordinates to be cut from the source is carried out beginning at address 4730.

The program then branches to address 6702 which matches coordinates to assure that there is adequate source to fit the desired destination. If there is not, the program defaults to address 1650 which it again displays the "C=copy, R=Rotates S=Scrap M=Modify" message allowing the operator to again attempt to identify a compatible source and destination. However, assuming the fit is proper, the program branches to the operation at address 10000 which serves to print corresponding numeric identifiers in the center of the source and destination which have been identified. The program then branches to a routine beginning at address 4849 which sets up an array of coordinates defining the corners of the identified destination and source portion. As can be seen from the code, the coordinates are stored in the XYZ array at previously unused locations just beyond those in which the original area coordinates had been stored. It is seen that twelve coordinates are set up in such a way that if they were drawn in sequence, a pair of rectangles with diagonal lines would be produced. The source diagonal runs from upper left to lower right and the destination diagonal from lower left to upper right in order to distinguish the two. After setting up the coordinates, at address 5290 the program is instructed to branch to the subroutine address 3190 which serves to draw the source and destination rectangles with opposed diagonals on the hard copy.

Following that, the program branches to address 4800 where the coordinates for the D array are updated to account for the partial use of the source. The numbers remaining in the D array represent the coordinates of the horizontal strip adjacent that taken from the source which remains after the source portion is taken.

The program is then caused to branch to address 7000 which allows the operator to input a second destination set of coordinates if there is sufficient scrap left within the source. It will be apparent from Appendix 1 that the operation is very similar to that just described. More particularly, the program branches to addess 9200 which prompts the operator to enter a new destination, then processes the entered information as generally described above.

Assuming that no new destination is required, the program thereupon branches to address 1650 which displays the familiar "C=Copy M=Modify R=Rotate S=Scrap" message. Even though the operator is this far into the program, he still has the option of selecting any of the four functions, including identification of a new source and destination for scrap.

When the operator is finally satisfied with the plot being produced, he selects the Copy option by depressing the C key on the keyboard, which causes the program to branch to address 2220, then to address 5600.

A message is displayed to the operator asking to pick off left-right dimensions of the respective lengths. The program advances to address 5650 which causes the zeroing of a set of arrays whose functions are as follows: The K element stores the left horizontal component for each strip, the L element stores the right horizontal coordinate for each strip, the P element stores the vertical coordinate (at which will be printed a strip identifying number), the R element stores the left offset into the pattern, the S element stores the right offset into the pattern, the G element is used to sequentially number the strips and the J element to store a waste factor created by the offsets. The branch to address 17,000 serves to enter sequential numbers in the G element of the array from 1 through 30.

The CRT is then used to display the prompt "Pick Off Left, Right (Call)". As described previously, the operator then manipulates the pen to define the left and right coordinate for each strip. The numbers are sequentially entered into the array by the subroutine extending from address 5690 through 5823. When all of the strips are defined, the program branches via address 5826 to the subroutine beginning at address 11,200 which serves to smooth the numbers so entered. Following return to address 5827, a routine is executed which determines the left and right offsets, and stores that information in the array. The instructions at addresses 5930-5945 serve to print the strip identification number to the right of the strip. The operation proceeds for each strip which had been identified by the operator.

When all strips have been identified and all offsets calculated, the address 5965 causes a branch to the subroutine beginning at address 13,000.

When an installation has a number of adjacent carpet lengths (as, for example, in FIG. 4) and it is necessary to match the pattern between lengths, there is often waste generated between the end of one strip and the beginning of the next in order to bring the patters into register. The sequence of steps beginning at address 13,000 is intended to determine the optimum manner of taking the strips from the roll in order to minimize this inter-strip waste. It is seen that the step at address 13,100 compares the righthand offset of a first strip to the lefthand step of the next adjacent strip in order to determine how much waste would be created if those strips were cut from the roll in sequence. The base strip is compared to each of the other strips in that manner, with the partial results being stored at Q5 and Q7. When the minimum waste combination is determined, the program advances to address 15,000 which serves to rotate the order of the strips in the array memory, leaving them in an order which minimizes inter-strip waste.

After the sequence has been performed which determines the order of cutting of the strips to minimize inter-strip waste, the program reverts to address 5970, which directs the sequence to address 6240 for printout of supplemental information. As can be seen from the code beginning at address 6240, supplemental information can include blanks for entry of the store number, sales person name, and customer identification, as well as the printout of numerical data such as material length, material width and pattern repeat dimensions, total number of square yards and the number of tackless strips required. The program ultimately advances to the address 6510, which reverts to the start, leaving the machine in condition for producing the next plot.

It will be seen that what has been provided is a method and apparatus for estimating carpet or floor covering material installations which not only serves to minimize material waste, but also accomplishes that in a fullproof manner, virtually eliminating the possibility of sending insufficient carpet to an installation. There is no need to add a percentage of carpet to the estimate "for insurance". If the installation works on the plotter, the installer can be assured that if he cuts and installs the carpet according to the plan, the job will go in as designed. The ability of the operator to interact with the plot as it is being produced allows great flexibility in tailoring the layout as well as lending him assurance that while he is tailoring the layout he is not introducing errors.

```
1 HOME
2 PRINT
3 N1=200
5 DIM U(8)
6 DIM D(4)
7 DIM B(8)
8 DIM T(8)
9 DIM K(30),L(30),P(30),R(30),S(30)
10 DIM G(30),J(30)
11 REM       DATE 2.01.81
20 M6=0
30 F3=0
35 Z9=0
98 N=0
99 X9=0
100 HOME
101 PAGE
102 PRINT "NEW DIAGRAM... ENTER SCALE FACTOR
110 Z7=0
120 C9=1
130 INPUT C
135 C=10/C
140 C8=C/200
150 IF C>200 THEN 100
160 WINDOW 0,C,0,C
170 VIEWPORT 0,100,0,100
180 HOME
190 PAGE
200 DIM X(200),Y(200),Z(200)
210 GOSUB 880
220 REM TABLE INIT
230 X(1)=0
240 Y(1)=0
250 Z(1)=0
290 Z(2)=0
300 MOVE @1:X(2),Y(2)
310 C9=C9*-1
320 IF C9>0 THEN 2880
330 PRINT "HORIZONTAL DIMENSION (FEET,INCHES)";
340 INPUT A1,A9
350 GOSUB 370
360 GO TO 490
370 REM
380 IF A1=0 THEN 450
390 IF A1<0 THEN 430
400 A9=A9/12
410 A1=A1+A9
420 RETURN
430 A9=A9*-1
440 GO TO 400
450 PRINT "POS(+) OR NEG(-) ";A9;" INCHES";
460 INPUT R$
470 IF R$="-" THEN 430
480 GO TO 400
490 X(N)=X(N-1)+A1
500 IF C9<0 THEN 2900
510 PRINT "VERTICAL DIMENSION (FEET,INCHES)";
520 INPUT A1,A9
530 GOSUB 370
540 A2=A1
```

```
550 Y(N)=Y(N-1)+A2
560 PRINT "ENTER (0=NO DRAW   1=DRAW   2=DRAW/TERMINATE)";
570 INPUT Z(N)
580 IF Z(N)=0 THEN 620
590 Z7=Z7+ABS(A1)
600 DRAW @1:X(N),Y(N)
610 GO TO 630
620 MOVE @1:X(N),Y(N)
630 IF Z(N)=2 THEN 700
640 N=N+1
650 IF N=201 THEN 680
660 GO TO 310
670 GO TO 700
680 PRINT "MAX POINTS"
690 GO TO 1
700 MOVE 0,0
710 Z6=INT(Z7)+1
720 N=2
730 HOME
740 PAGE
750 IF X(N)=>201 THEN 820
760 N=N+1
770 GO TO 750
820 GOSUB 1110
830 REM DATA INPUT
835 IF N<>1 THEN 870
860 GOSUB 1530
870 GO TO 1610
880 N=1
890 REM INIT
900 X(N)=201
910 Y(N)=201
920 Z(N)=201
930 N=N+1
940 IF N<>201 THEN 900
950 RETURN
960 N=2
970 REM PAT GEN
980 PAGE
990 HOME
1000 MOVE 0,0
1010 IF Z(N)<>0 THEN 1040
1020 MOVE X(N),Y(N)
1030 GO TO 1060
1040 IF Z(N)=>201 THEN 1100
1050 DRAW X(N),Y(N)
1060 IF Z(N)=>201 THEN 1100
1070 IF N=>201 THEN 1100
1080 N=N+1
1090 GO TO 1010
1100 RETURN
1110 PRINT "HORIZONTAL PATTERN REPEAT (:
1120 F2=0
1130 INPUT H
1140 IF H=0 THEN 6520
1150 H=H/12
1160 PRINT "VERTICAL PATTERN REPEAT (IN(
1170 INPUT V
1180 PRINT "PRINT PATTERN REPEAT? (1=YES
1190 INPUT M9
```

```
1200 V=V/12
1210 PRINT "DROP PATTERN? (1=YES 0=NO)",
1220 INPUT V8
1222 PRINT "TACKLESS? (1=YES 0=NO)";
1224 INPUT F3
1230 PRINT "ROLL WIDTH (FEET)";
1240 INPUT E
1250 RETURN
1253 PRINT "SET PATTERN POSITION /PUSH !
1260 INPUT @1,27:W,Q,B1
1270 A=W
1280 F=Q
1290 W=W*C/100
1300 Q=Q*C/100
1310 Q1=W
1320 Q2=Q
1330 GOSUB 3750
1340 W=Q1
1350 Q=Q2
1390 V9=0
1470 RETURN
1530 RETURN
1535 N=2
1540 MOVE @1:(X(N)+X(N+1))/2,(Y(N)+Y(N+1))/2
1550 X1=SQR((X(N+1)-X(N))^2+(Y(N+1)-Y(N))^2)
1560 IF Z(N+1)=0 THEN 1590
1570 GOSUB 3090
1580 PRINT @1: USING 2400:Q1,Q2
1590 N=N+1
1600 IF Z(N+1)<>201 THEN 1540
1605 RETURN
1610 GOSUB 22000
1650 HOME
1655 PAGE
1660 PRINT "ENTER  C=COPY  M=MODIFY  R=ROTATE  S=SCRAP GGGGG";
1670 INPUT U$
1680 IF U$="S" THEN 6620
1690 PAGE
1700 IF U$="R" THEN 2930
1710 IF U$="C" THEN 2220
1712 IF U$="Y" THEN 1660
1715 IF U$="N" THEN 1660
1720 GOSUB 11000
1721 HOME
1722 PAGE
1723 PRINT "INSERT NEW PAPER (TYPE ! TO CONTINUE) ";
1724 INPUT N
1725 Z9=0
1730 M6=0
1731 X9=0
1732 GOSUB 960
1735 GOSUB 3170
1740 GO TO 860
1750 N=2
1760 M3=0
1770 M4=0
1780 M1=201
1790 M2=201
1800 IF X(N)=201 THEN 1850
1810 IF X(N)=>M1 THEN 1830
```

```
1820 M1=X(N)
1830 N=N+1
1840 GO TO 1800
1850 N=2
1860 IF X(N)=201 THEN 1910
1870 IF X(N)<=M3 THEN 1890
1880 M3=X(N)
1890 N=N+1
1900 GO TO 1860
1910 N=2
1920 IF Y(N)=201 THEN 1970
1930 IF Y(N)=>M2 THEN 1950
1940 M2=Y(N)
1950 N=N+1
1960 GO TO 1920
1970 N=2
1980 IF Y(N)=201 THEN 2040
1990 IF Y(N)<=M4 THEN 2010
2000 M4=Y(N)
2010 N=N+1
2020 GO TO 1980
2030 RETURN
2040 REM PLOT DOT
2050 B1=V9
2060 A=H9
2065 W=A
2070 REM
2080 IF A<X5 THEN 2140
2090 IF A>X6 THEN 2140
2100 IF B1<Y5 THEN 2140
2110 IF B1>Y6 THEN 2190
2120 MOVE @1:A,B1
2130 RDRAW @1:0,0
2140 A=A+H
2150 IF A<C THEN 2070
2160 A=W
2170 B1=B1+V
2180 IF B1<C THEN 2070
2190 RETURN
2200 A=H9-H/2
2210 RETURN
2220 REM
2230 REM
2250 GOSUB 5600
2260 GO TO 100
2270 F=F1
2280 MOVE @1:X5,F
2290 REM PLOTTER SEAM GEN
2300 IF F<Y5 THEN 2330
2310 IF F>Y6 THEN 2330
2320 Q1=F
2322 Q4=X5
2324 Q2=X6
2326 GOSUB 24000
2330 F=F+E
2340 IF F<C THEN 2280
2350 RETURN
2880 A1=0
2890 GO TO 360
2900 A2=0
```

```
2910 GO TO 550
2920 REM ROTATE 90 DEG
2930 PRINT "LOAD NEW PAPER- TYPE 1 TO C(
2931 Z9=0
2935 GOSUB 11000
2950 INPUT Q1
2960 FOR N=1 TO 100
2970 Q1=Y(N)
2980 Y(N)=X(N)
2990 X(N)=Q1
3000 NEXT N
3010 GOSUB 3300
3060 GOSUB 3140
3070 GO TO 1730
3080 REM DEC FT/FT IN (X1=INP Q1=FEET Q
3090 Q1=INT(X1)
3100 Q2=X1-Q1
3110 Q2=Q2*12
3120 IF Q2>11.2 THEN 3140
3130 RETURN
3140 Q1=Q1+1
3150 Q2=0
3160 RETURN
3170 N=2
3180 REM PATTERN GEN #2(PLOTTER)
3190 MOVE @1:0,0
3200 IF Z(N)<>0 THEN 3230
3210 MOVE @1:X(N),Y(N)
3220 GO TO 3250
3230 IF Z(N)=>201 THEN 3290
3240 DRAW @1:X(N),Y(N)
3250 IF Z(N)=>201 THEN 3290
3260 IF N=>201 THEN 3290
3270 N=N+1
3280 GO TO 3200
3290 RETURN
3300 N=2
3310 IF X(N)=>201 THEN 3360
3320 X(N)=C-X(N)
3330 N=N+1
3340 IF N=>200 THEN 3360
3350 GO TO 3310
3360 RETURN
3370 REM SCRAP LOCATION ROUTINE (PLOTTER)
3380 GOSUB 3400
3390 GO TO 3770
3399 REM SCRAP INPUT
3400 PRINT "DEFINE SCRAP DESTINATION AND SOURCE
3420 INPUT @1,27:U(1),U(2)
3430 PRINT "G"
3440 INPUT @1,27:U(3),U(4)
3450 PRINT "G "
3460 IF U(1)<U(3) THEN 3500
3470 Q1=U(1)
3480 U(1)=U(3)
3490 U(3)=Q1
3500 IF U(2)<U(4) THEN 3540
3510 Q1=U(2)
3520 U(2)=U(4)
3530 U(4)=Q1
```

```
3540 INPUT @1,27:U(5),U(6)
3550 PRINT "GG "
3560 INPUT @1,27:U(7),U(8)
3570 IF U(5)<U(7) THEN 3610
3580 Q1=U(5)
3590 U(5)=U(7)
3600 U(7)=Q1
3610 IF U(6)<U(8) THEN 3650
3620 Q1=U(6)
3630 U(6)=U(8)
3640 U(8)=Q1
3650 PRINT "GG      "
3660 FOR N=1 TO 8
3670 U(N)=U(N)*C/100
3680 NEXT N
3740 RETURN
3750 REM FUZZ
3751 REM N=1
3755 N=1
3760 IF ABS(X(N)-Q1)<C8 THEN
3770 IF X(N+1)=>201 THEN 3820
3780 IF N=200 THEN 3820
3790 N=N+1
3800 GO TO 3760
3810 Q1=X(N)
3820 N=1
3830 IF ABS(Y(N)-Q2)<C8 THEN
3840 IF N=200 THEN 3880
3850 N=N+1
3860 GO TO 3830
3870 Q2=Y(N)
3880 REM
3890 N=0
3900 IF ABS(Q2-(Q+E*N))<C8 TH
3910 IF X(N+1)=>201 THEN 3960
3920 IF N=200 THEN 3960
3930 N=N+1
3940 GO TO 3900
3950 Q2=Q+E*N
3960 RETURN
3965 REM FUZZ
3970 FOR M=1 TO 4
3980 Q1=U(2*M-1)
3990 Q2=U(2*M)
4000 GOSUB 3750
4010 U(2*M-1)=Q1
4020 U(2*M)=Q2
4030 NEXT M
4170 RETURN
4350 REM VERT OFFSET
4360 T9=V*((B(2)-V7)/V-INT((B(2)-V7).
4370 J1=V*((D(2)-V9)/V-INT((D(2)-V9).
4380 J2=T9-J1
4390 IF J2=>0 THEN 4410
4400 J2=J2+V
4410 RETURN
4415 REM HORIZ OFFSET
4420 T9=H*((B(1)-H7)/H-INT((B(1)-H7).
4430 J1=H*((D(1)-H9)/H-INT((D(1)-H9).
4435 J3=T9-J1
```

```
4440 IF J3=>0 THEN 4460
4450 J3=J3+H
4460 RETURN
4470 REM CAL T(X)
4480 H7=H9
4490 V7=V9
4500 GOSUB 4360
4505 GOSUB 4415
4510 J4=J3
4520 J5=J2
4530 IF V8=0 THEN 4650
4540 H7=H9-H/2
4550 IF H7=>0 THEN 4570
4560 H7=H7+H
4570 V7=V9-V/2
4580 IF V7=>0 THEN 4600
4590 V7=V7+V
4600 GOSUB 4360
4610 GOSUB 4415
4620 IF J2>J5 THEN 4650
4630 J4=J3
4640 J5=J2
4650 T(5)=D(1)+J4
4660 IF D(3)-T(5)<=B(3)-B(1) THEN
4670 T(7)=T(5)+B(3)-B(1)
4680 GO TO 4700
4690 T(7)=D(3)
4700 T(1)=B(1)
4710 T(2)=B(2)
4720 T(3)=B(1)+T(7)-T(5)
4730 T(6)=D(2)+J5
4740 IF D(4)-T(6)<=B(4)-B(2) THEN
4750 T(8)=T(6)+B(4)-B(2)
4760 GO TO 4780
4770 T(8)=T(6)+D(4)-D(2)
4780 T(4)=B(2)+T(8)-T(6)
4790 RETURN
4800 REM CAL D
4805 IF T(7)=>U(7) THEN 4830
4810 D(1)=T(7)
4812 D(2)=T(6)
4815 D(3)=U(7)
4820 D(4)=T(8)
4825 GO TO 4845
4830 D(1)=U(5)
4832 D(2)=T(8)
4835 D(3)=U(7)
4840 D(4)=U(8)
4845 RETURN
4847 REM DRAW SCRAP
4849 N=1
4850 IF Z(N)=2 THEN 4890
4860 N=N+1
4870 IF N>200 THEN 6600
4880 GO TO 4850
4890 Z(N)=3
4900 N=N+1
4910 X(N)=T(1)
4920 Y(N)=T(2)
4930 Z(N)=0
```

```
4940 X(N+1)=T(3)
4950 Y(N+1)=T(2)
4960 Z(N+1)=1
4970 X(N+2)=T(3)
4980 Y(N+2)=T(4)
4990 Z(N+2)=1
5000 X(N+3)=T(1)
5010 Y(N+3)=T(4)
5020 Z(N+3)=1
5030 X(N+4)=T(1)
5040 Y(N+4)=T(2)
5050 Z(N+4)=1
5060 X(N+5)=T(3)
5070 Y(N+5)=T(4)
5080 Z(N+5)=1
5090 X(N+6)=T(7)
5100 Y(N+6)=T(6)
5110 Z(N+6)=0
5120 X(N+7)=T(7)
5130 Y(N+7)=T(8)
5140 Z(N+7)=1
5150 X(N+8)=T(5)
5160 Y(N+8)=T(8)
5170 Z(N+8)=1
5180 X(N+9)=T(5)
5190 Y(N+9)=T(6)
5200 Z(N+9)=1
5210 X(N+10)=T(7)
5220 Y(N+10)=T(6)
5230 Z(N+10)=1
5240 X(N+11)=T(5)
5250 Y(N+11)=T(8)
5260 Z(N+11)=2
5270 N1=N
5280 N2=N
5290 GOSUB 1000
5300 N=N2
5310 GOSUB 3190
5320 RETURN
5330 IF V8<>1 THEN 5380
5340 IF O3=1 THEN 5360
5350 GO TO 6120
5510 N=N1
5520 IF Z(N)<>0 THEN 5550
5530 MOVE @1:X(N),Y(N)
5540 GO TO 5570
5550 IF X(N)=>201 THEN 1100
5560 DRAW @1:X(N),Y(N)
5570 IF N=>201 THEN 1100
5580 N=N+1
5590 GO TO 5520
5600 HOME
5610 PAGE
5620 PRINT "DO YOU NEED TO SELECT ANY DIMENSIONS (1=YE
5630 INPUT Q1
5650 FOR N=1 TO 30
5660 K(N)=0
5665 L(N)=0
5670 P(N)=0
5675 R(N)=0
```

```
5680 S(N)=0
5682 G(N)=0
5683 J(N)=0
5684 NEXT N
5685 IF Q1<>1 THEN 6240
5686 GOSUB 17000
5687 PRINT "PICKOFF LEFT,RIGHT (CAL
5690 N=0
5695 N=N+1
5710 INPUT @1,27:Q1,Q2
5720 Q1=Q1*C/100
5730 Q2=Q2*C/100
5735 GOSUB 32000
5750 K(N)=Q1
5760 PRINT "G"
5770 INPUT @1,27:Q1,Q2
5780 Q1=Q1*C/100
5790 Q2=Q2*C/100
5795 GOSUB 32000
5800 P(N)=Q2
5820 L(N)=Q1
5822 PRINT "GG"
5823 IF K(N)<L(N) THEN 5695
5824 K(N)=0
5825 L(N)=0
5826 GOSUB 11200
5827 N=1
5828 H1=K(N)
5829 H2=L(N)
5830 Q1=H1
5840 GOSUB 5990
5850 H3=(H-Q3)*12
5855 IF H3<>H*12 THEN 5860
5857 H3=0
5860 Q1=H2
5870 GOSUB 5990
5880 H4=(H-Q3)*12
5885 IF H4<>H*12 THEN 5890
5887 H4=0
5890 H5=H2-H1
5892 R(N)=H3
5894 S(N)=H4
5900 MOVE @1:L(N),P(N)
5910 X1=H5
5920 GOSUB 3090
5930 IMAGE 2D,")"
5940 PRINT @1: USING 5930:N
5945 PRINT N;Q1;Q2;H3;H4
5950 N=N+1
5960 IF K(N)<L(N) THEN 5828
5965 GOSUB 13000
5967 GOSUB 19000
5970 GO TO 6240
5990 Q3=H-((Q1-H9)/H-INT((Q1-H9)/H))*H
6000 RETURN
6010 IF V8<>1 THEN 6110
6020 A=H9-H/2
6030 IF A>0 THEN 6050
6040 A=A+H
6050 W=A
```

```
6060 B1=V9-V/2
6070 IF B1>0 THEN 6100
6080 B1=B1+V
6090 IF M9=0 THEN 6110
6100 GOSUB 2080
6110 RETURN
6120 C3=1
6130 T5=O5
6140 T6=O6
6150 T7=O7
6160 T8=O8
6170 O1=H9-H/2
6180 IF O1=>0 THEN 6200
6190 O1=O1+H
6200 O2=V9-V/2
6210 IF O2=>0 THEN 6230
6220 O2=O2+V
6230 GO TO 4370
6240 WINDOW 0,89,0,89.5
6250 MOVE @1:40,87
6260 PRINT @1:"PATTERN SCAN INC.      COPYRIGHT APPLIED F
6270 MOVE @1:95,84
6280 PRINT @1:"STORE #_____"
6290 MOVE @1:95,81
6300 PRINT @1:"SALESPERSON_____"
6310 MOVE @1:95,78
6320 PRINT @1:"CUSTOMER _____"
6325 GOSUB 20000
6330 MOVE @1:97,9
6333 GOSUB 21000
6335 IMAGE "TOTAL MAT=",3D,"/",2D,"//"
6340 PRINT @1: USING 6335:Q1,Q2
6350 MOVE @1:97,7
6360 PRINT @1:"WIDTH=";E
6370 IF F2=1 THEN 6451
6380 MOVE @1:97,5
6385 IMAGE   "SQ. YD.= ",FD.2D
6390 PRINT @1:"PTN RPT=(H)";H*12;" (V)";V*12
6400 MOVE @1:97,3
6410 IF V8<>1 THEN 6450
6420 PRINT @1:"DROP";
6430 REM
6440 GO TO 6451
6450 PRINT @1:"NO DROP";
6451 MOVE @1:97,1
6452 PRINT @1: USING 6385:X1*E/9
6460 MOVE @1:0,0
6470 Z7=ABS(Z6/4)+1
6480 Z6=INT(Z7)
6485 IF F3=0 THEN 6500
6490 PRINT @1:"TAC. STRIP REQ.  ";Z6;" PCS."
6500 WINDOW 0,C,0,C
6510 GO TO 1
6520 REM         NO PATTERN AREA
6525 V8=0
6530 F2=1
6540 H=0.0833333
6550 V=0.0833333
6560 M9=0
6570 GO TO 1230
```

```
6580 GOSUB 3380
6590 GO TO 1650
6600 RETURN
6610 GO TO 680
6620 REM MUL SCRAP ENTER POINT
6630 GOSUB 3400
6640 FOR N=1 TO 8
6650 B(N)=U(N)
6660 NEXT N
6670 FOR N=1 TO 4
6680 D(N)=B(N+4)
6690 NEXT N
6700 GOSUB 4470
6702 IF X9>T(8) THEN 6704
6703 X9=T(8)
6704 IF T(8)=>U(8) THEN 31000
6705 IF T(8)-T(6)<1.0E-3 THEN 31
6706 IF T(7)<T(5) THEN 6720
6707 GOSUB 10000
6710 GOSUB 4849
6720 GOSUB 4800
6730 IF T(3)=U(3) THEN 7000
6740 IF D(1)=U(5) THEN 7030
6750 IF T(8)=U(8) THEN 31000
6755 B(1)=T(3)
6760 GO TO 6700
7000 REM SECONDARY SCRAP ENTRY
7005 IF U(8)-D(2)<1.0E-3 THEN
7010 GOSUB 9200
7014 FOR N=1 TO 4
7015 B(N)=U(N)
7016 NEXT N
7017 IF T(7)=U(7) THEN 7025
7018 D(4)=D(2)+U(4)-U(2)
7019 IF D(4)<B(6) THEN 7024
7020 B(6)=D(4)
7024 GO TO 6700
7025 FOR N=1 TO 4
7026 D(N)=B(N+4)
7027 NEXT N
7028 D(2)=T(8)
7029 GO TO 6700
7030 REM C  B(X)
7050 B(6)=T(8)
7052 B(1)=T(3)
7054 IF B(6)>X9 THEN 7060
7055 B(6)=X9
7060 IF B(1)=>U(1) THEN 7080
7070 B(1)=U(1)
7080 GO TO 6670
9090 RETURN
9190 REM SECONDARY INPUT
9200 HOME
9202 PRINT
9203 PRINT
9205 PRINT "NEW DESTINATION? (Y OR N)(CALL) GG(
9207 INPUT A$
9208 IF A$="Y" THEN 9210
9209 GO TO 1650
9210 INPUT @1,27:U(1),U(2)
```

```
9220 PRINT "G"
9230 INPUT @1,27:U(3),U(4)
9240 PRINT "G"
9250 IF U(1)<U(3) THEN 9300
9260 Q1=U(1)
9270 U(1)=U(3)
9280 U(3)=Q1
9300 IF U(2)<U(4) THEN 9350
9310 Q1=U(2)
9320 U(2)=U(4)
9330 U(4)=Q1
9350 FOR N=1 TO 4
9360 U(N)=U(N)*C/100
9370 NEXT N
9480 RETURN
9500 RETURN
9510 FOR M=1 TO 2
9520 GO TO 3980
10000 REM IDENTIFIER
10010 M6=M6+1
10020 MOVE (T(3)+T(1))/2,(T(4)+T(2))/2
10025 PRINT M6
10030 MOVE @1:(T(3)+T(1))/2,(T(4)+T(2)
10035 PRINT @1:M6
10040 MOVE (T(7)+T(5))/2,(T(8)+T(6))/2
10045 PRINT M6
10050 MOVE @1:(T(7)+T(5))/2,(T(8)+T(6)
10060 PRINT @1:M6
10070 RETURN
11000 REM REINIT
11010 N=1
11020 IF Z(N)>1.5 THEN 11100
11030 N=N+1
11040 IF N<200 THEN 11020
11050 RETURN
11100 Z(N+1)=201
11110 RETURN
11199 REM FUZZ
11200 I=1
11201 PRINT "GGGGGGGG"
11205 IF K(I)=0 THEN 11310
11210 Q1=K(I)
11220 Q2=1
11230 GOSUB 3750
11240 K(I)=Q1
11250 Q1=L(I)
11260 Q2=P(I)
11270 GOSUB 3750
11280 L(I)=Q1
11290 P(I)=Q2
11300 I=I+1
11305 IF I<30 THEN 11205
11310 RETURN
12000 REM WASTE CALC
12005 G1=0
12010 N=1
12020 IF K(N+1)=0 THEN 13000
12030 IF S(N)<=R(N+1) THEN 1
12040 G(I)=R(N+1)-S(N)+H
12050 GO TO 12200
```

```
12100 G(N)=R(N+1)-S(N)
12110 GO TO 12200
12200 G1=G1+G(N)
12210 GO TO 12020
12215 N=N+1
13000 REM ORDER
13010 I=1
13020 Q6=I+1
13030 N2=I+1
13040 Q5=100000
13050 IF K(N2)=0 THEN 14000
13060 IF S(I)<=R(N2) THEN 13
13070 Q7=R(N2)-S(I)+H*12
13080 GO TO 13200
13100 Q7=R(N2)-S(I)
13200 IF Q7>Q5 THEN 13300
13210 Q5=Q7
13220 Q6=N2
13300 N2=N2+1
13302 IF Q7=0 THEN 1400
13310 GO TO 13050
14000 IF Q6=I+1 THEN 14
14005 I=I+1
14010 GOSUB 15000
14015 I=I-1
14100 I=I+1
14110 IF K(I)<>0 THEN 1
14120 RETURN
15000 REM EX (I) AND (Q
15010 N2=30
15100 K(N2)=K(I)
15110 L(N2)=L(I)
15120 P(N2)=P(I)
15130 R(N2)=R(I)
15140 S(N2)=S(I)
15150 G(N2)=G(I)
15160 J(N2)=J(I)
15200 K(I)=K(Q6)
15210 L(I)=L(Q6)
15220 P(I)=P(Q6)
15230 R(I)=R(Q6)
15240 S(I)=S(Q6)
15250 G(I)=G(Q6)
15260 J(I)=J(Q6)
15300 K(Q6)=K(N2)
15310 L(Q6)=L(N2)
15320 P(Q6)=P(N2)
15330 R(Q6)=R(N2)
15340 S(Q6)=S(N2)
15350 G(Q6)=G(N2)
15360 J(Q6)=J(N2)
15400 K(N2)=0
15410 L(N2)=0
15420 P(N2)=0
15430 R(N2)=0
15440 S(N2)=0
15450 G(N2)=0
15460 J(N2)=0
15500 RETURN
16000 REM FIND LARGEST WASTE Q6=COUNT Q5=WA
```

```
16002 GOSUB 18200
16004 R(Q7)=R(1)
16006 S(Q7)=S(1)
16010 N2=1
16020 Q5=0
16030 IF K(N2)=0 THEN 16500
16040 IF S(N2)<=R(N2+1) THEN 16100
16050 Q7=R(N2+1)-S(N2)+H*12
16060 GO TO 16200
16100 Q7=R(N2+1)-S(N2)
16200 IF Q7<Q5 THEN 16300
16210 Q5=Q7
16220 Q6=N2
16300 N2=N2+1
16310 GO TO 16030
16500 RETURN
17000 REM G INIT
17010 FOR I=1 TO 30
17020 G(I)=I
17030 NEXT I
17040 RETURN
18000 REM ROTATE
18010 GOSUB 18200
18020 N2=Q7
18030 N3=N2
18040 N2=N2-1
18050 N4=N2
18060 GOSUB 18500
18070 IF N2<>1 THEN 18030
18080 N4=Q7
18090 N3=1
18100 GOSUB 18500
18110 K(Q7)=0
18120 RETURN
18200 REM LIMIT Q7
18210 N2=1
18220 IF K(N2)=0 THEN 18250
18230 N2=N2+1
18240 GO TO 18220
18250 Q7=N2
18260 RETURN
18500 K(N3)=K(N4)
18510 L(N3)=L(N4)
18520 R(N3)=R(N4)
18530 S(N3)=S(N4)
18540 G(N3)=G(N4)
18550 RETURN
19000 REM ROT SORT
19001 RETURN
19010 GOSUB 16000
19020 FOR N5=1 TO Q6
19030 GOSUB 18000
19040 NEXT N5
19050 RETURN
20000 REM     PRINT ROUT. MAIN PC ORD
20002 N=1
20003 IF K(N)=0 THEN 20050
20006 X1=L(N)-K(N)
20007 GOSUB 25000
20008 GOSUB 3080
```

```
20009 MOVE @1:105,75-3*N
20010 IMAGE 2D,")",3D,"/",2D,"  "
20020 PRINT @1: USING 20010:G,H
20030 N=N+1
20040 GO TO 20003
20050 RETURN
21000 REM        ADD TOTAL
21010 GOSUB 21200
21020 GOSUB 21300
21030 X1=Q1+X2/12
21032 GOSUB 3080
21040 RETURN
21200 Q1=0
21210 N=1
21220 IF K(N)=0 THEN 21260
21230 Q1=Q1+L(N)-K(N)
21240 N=N+1
21250 GO TO 21220
21260 RETURN
21300 Q2=0
21310 N=1
21320 IF K(N+1)=0 THEN 21390
21325 Q3=R(N+1)-S(N)
21330 IF Q3=>-0.01 THEN 21340
21335 Q3=Q3+H*12
21340 Q2=Q2+Q3
21345 N=N+1
21350 GO TO 21320
21390 X2=Q2
21395 RETURN
22000 HOME
22001 PAGE
22005 PRINT "SET SEAM POSITION -PUSH CAL
22010 INPUT @1,27:Q2,Q,B1
22011 Z7=Q2
22012 Z8=Q
22013 W=Q2
22014 IF Z9<>0 THEN 22020
22015 GOSUB 1270
22016 Z9=1
22017 Q2=Z7
22018 Q=Z8
22020 F=Q
22030 F=F*(C/100)
22050 GOSUB 23000
22070 F1=E*(F/E-INT(F/E))
22080 PRINT "INPUT LOW LEFT BOU
22090 INPUT @1,27:Q2,Q,B1
22100 X5=Q2*C/100
22110 Y5=Q*C/100
22120 PRINT "INPUT HIGH RIGHT B
22130 INPUT @1,27:Q2,Q,B1
22135 PRINT "GGGG"
22140 X6=Q2*C/100
22150 Y6=Q*C/100
22151 IF M9=0 THEN 22155
22152 GOSUB 2050
22153 GOSUB 6010
22155 IF Y6=Y5 THEN 22170
22157 Q1=X5
```

```
22158 Q2=Y6
22159 Q4=Y5
22160 GOSUB 23200
22161 Q2=Y6
22163 Q1=X6
22164 Q4=Y5
22167 GOSUB 23200
22168 GOSUB 2270
22169 GO TO 22000
22170 RETURN
23000 REM SEAM MATCH
23002 X7=V9
23003 IF V8=0 THEN 23010
23004 X7=X7+V/2
23005 GO TO 23020
23010 X7=X7+V
23020 IF X7<F THEN 23003
23030 F=X7
23060 RETURN
23200 REM VER DASHED LINE
23201 RETURN
23205 MOVE @1:Q1,Q4
23210 Q3=Q4
23220 IF Q3>Q2 THEN 23290
23230 DRAW @1:Q1,Q3+0.4
23240 MOVE @1:Q1,Q3+0.8
23250 Q3=Q3+0.8
23260 GO TO 23220
23290 RETURN
24000 REM HOR DASHED LINE
24005 MOVE @1:Q4,Q1
24010 Q3=Q4
24020 IF Q3>Q2 THEN 24090
24030 DRAW @1:Q3+0.8,Q1
24040 MOVE @1:Q3+1.6,Q1
24050 Q3=Q3+1.6
24060 GO TO 24020
24090 RETURN
25000 Q3=R(N+1)-S(N)
25010 IF Q3=>-0.01 THEN 2
25015 Q3=Q3+H*12
25020 IF K(N+1)<>0 THEN 2
25025 Q3=0
25030 REM
25040 Q3=Q3/12
25050 X1=X1+Q3
25060 RETURN
30000 GOSUB 21000
30005 STOP
30999 REM MULT VERT
31000 GO TO 1650
31005 M1=U(4)
31010 U(4)=U(2)+T(8)-U(6
31020 IF M1-U(4)<1 THEN
31030 GO TO 6640
32000 REM VERT MARKER
32010 DRAW @1:Q1,Q2+0.5
32020 MOVE @1:Q1,Q2+1
32030 DRAW @1:Q1,Q2+1.5
32040 MOVE @1:Q1,Q2+2
```

```
32050 DRAW @1:Q1,Q2+2.5
32060 MOVE @1:Q1,Q2
32070 RETURN
32080 REM COPYRIGHT 1981
32090 REM PATTERN SCAN IN
```

We claim as our invention:

1. A method of operating a plotter to produce a plot showing the fit of material of predetermined dimensional characteristics into a given area including the identification of seams between adjacent strips of said material, wherein the plotter is arranged to exchange signals with a computer, said method comprising the steps of, inputting to the computer and storing an array of signals which define the coordinates of the given area, transferring said signals to the plotter to plot the area outline, inputting to the computer and storing a set of signals related to the dimensional characteristics of the material, manually manipulating the plotter to produce and transfer a signal to the computer defining a selected seam separating two adjacent strips of material, transferring signals from the computer to the plotter to plot all seams between each strip of material, defining the length of each plotted strip, and determining and displaying the order in which the strips are to be taken from a material supply.

2. The method as set out in claim 1 further including the steps of manually manipulating the plotter to produce and transfer signals to the computer defining a scrap source area and at least one scrap destination area to be covered with material taken from the source area, in the computer relating scrap destination coordinates to pattern repeat dimensional characteristics of the material, in the computer defining particular source coordinates within the source area which take into account the matching of the pattern at the scrap destination area, and transferring signals to the plotter to plot the destination area and the source portion corresponding thereto.

3. Apparatus for plotting the fit of material of predetermined dimensional characteristics into a given area including the identification of seams between adjacent strips of said material, comprising in combination, a processor having a memory for receiving and storing signals corresponding to an array of coordinates defining the area, a plotter responsive to the stored signals for plotting the outline of the corresponding area, means for accepting and storing a second group of signals relating to the dimensional characteristics of the material to be fit within the given area, the plotter including means for manual manipulation thereof and means for transferring signals to the processor in response to manual manipulation, the processor including means for accepting a signal from the plotter and in response thereto using the second group of stored signals to define and plot all seam locations.

4. The apparatus as set out in claim 3 in which the processor includes means for accepting additional signals from the plotter which identify coordinates of a scrap source area and at least one scrap destination area to be covered with material taken from said source area, means for relating the scrap destination coordinates to pattern repeat dimensional characteristics of said material, means for selecting particular source coordinates within said defined source area which take into account the matching of the pattern at the scrap destination area, and means for transferring signals to the plotter to plot the destination area and the source portion corresponding thereto.

* * * * *

UNITED STATES PATENT AND TRADEMARK OFFICE
CERTIFICATE OF CORRECTION

PATENT NO. : 4,428,056

DATED : January 24, 1984

INVENTOR(S) : Kenneth Schroeder and James Griffin

It is certified that error appears in the above-identified patent and that said Letters Patent is hereby corrected as shown below:

Column 12, l. 26, "propriae" should read -- propriate --.

Column 14, l. 26, "step" should read -- offset --.

Column 29, line 54, change "(1=YE" to read -- (1=YES 0=NO)"; --.

Column 31, l. 7, change "(CA" to read -- (CALL)" --.

Column 35, l. 27, after the word "SCRAP" insert -- ENTRY --;

l. 28, after "IF", delete the rest of the line and insert -- U(8)-D(2) <1.0E-3 THEN 1650 --;

l. 56, change "GG" to read -- GGGGG"; --.

Column 37, l. 23, end of line, change "+T(2" to read -- +T(2))/2 --;

l. 25, change "+T(6))" to -- +T(6))/2 --;

l. 27, change "+T(6" to read -- +T(6))/2 --.

Column 39, last line, change "Q5=WA" to read -- Q5=WASTE --.

Column 41, line 55, change "OR" to -- ORDER --.

Column 43, l. 2, after "2D", add -- " // " --;

l. 3, after "20010" add -- :G(N),Q1,Q2 --;

l. 33, change "CAL" to read -- CALL G --.

UNITED STATES PATENT AND TRADEMARK OFFICE
CERTIFICATE OF CORRECTION

PATENT NO. : 4,428,056

DATED : January 24, 1984

INVENTOR(S) : Kenneth Schroeder and James Griffin

It is certified that error appears in the above-identified patent and that said Letters Patent is hereby corrected as shown below:

Column 45, l. 30, change "LINE" to read -- LINES --;
l. 40, after "THEN", add -- 25020 --;
l. 42, after "THEN", add -- 25030 --;
l. 53, change "-U(6" to read -- -U(6)-V --;
l. 54, after "THEN", add -- 1650 --.

Signed and Sealed this

Fifth Day of March 1985

[SEAL]

Attest:

DONALD J. QUIGG

Attesting Officer    Acting Commissioner of Patents and Trademarks